(12) United States Patent
Engel et al.

(10) Patent No.: US 12,265,974 B2
(45) Date of Patent: *Apr. 1, 2025

(54) SYSTEM AND METHOD FOR PROVIDING ADVERTISING CONTENT VIA MOBILE DEVICE DOCKING STATION

(71) Applicant: Oohdoo, Inc., Grapevine, TX (US)

(72) Inventors: Randy Engel, Grapevine, TX (US); Darren W. Collins, Grapevine, TX (US)

(73) Assignee: Oohdoo, Inc., Grapevine, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/544,583

(22) Filed: Aug. 19, 2019

(65) Prior Publication Data

US 2019/0378147 A1 Dec. 12, 2019

Related U.S. Application Data

(63) Continuation of application No. 12/843,154, filed on Jul. 26, 2010, now Pat. No. 10,423,967, which is a continuation-in-part of application No. 12/510,645, filed on Jul. 28, 2009, now abandoned.

(51) Int. Cl.
*G06Q 30/02* (2023.01)
*G06Q 30/0251* (2023.01)
*H04M 15/00* (2024.01)

(52) U.S. Cl.
CPC ......... *G06Q 30/02* (2013.01); *G06Q 30/0255* (2013.01); *G06Q 30/0261* (2013.01); *G06Q 30/0267* (2013.01); *H04M 15/00* (2013.01); *H04M 2215/0192* (2013.01)

(58) Field of Classification Search
CPC ............... G06Q 30/02; G06Q 30/0255; G06Q 30/0261; G06Q 30/0267; H04M 15/00; H04M 2215/0192
See application file for complete search history.

(56) References Cited

U.S. PATENT DOCUMENTS

| | | | |
|---|---|---|---|
| 6,546,287 B1 | 4/2003 | Havel et al. |
| 6,622,083 B1 | 9/2003 | Knockeart et al. |
| 6,813,558 B1 | 11/2004 | Lapstun et al. |
| 7,054,423 B2 | 5/2006 | Nebiker et al. |
| 7,487,112 B2 | 2/2009 | Barnes |
| 7,908,080 B2 | 3/2011 | Rowely et al. |

(Continued)

OTHER PUBLICATIONS

Estimating the Capacity of the Location—Based Advertising Channel (Year: 2007).*

(Continued)

*Primary Examiner* — Gautam Ubale
(74) *Attorney, Agent, or Firm* — McGuire Woods LLP

(57) ABSTRACT

Certain of the disclosed embodiments present a system and method for providing in-home targeted advertisements to individual consumers. For instance, the disclosed embodiments include an in-home advertising device that enables a user to interact with the in-home advertising device and purchase items with the push of a button. Additionally, in some embodiments, the in-home advertising device may include a built in printer for enabling a user to print an advertised and/or coupon.

16 Claims, 8 Drawing Sheets

(56) References Cited

U.S. PATENT DOCUMENTS

| | | | |
|---|---|---|---|
| 7,933,895 B2* | 4/2011 | Amjadi | G06Q 30/02 705/14.1 |
| 8,024,111 B1 | 9/2011 | Meadows et al. | |
| 8,057,303 B2 | 11/2011 | Rasmussen et al. | |
| 2002/0077910 A1* | 6/2002 | Shioda | G06Q 30/0273 701/1 |
| 2002/0087392 A1 | 7/2002 | Stevens | |
| 2002/0091570 A1* | 7/2002 | Sakagawa | G06Q 30/0208 709/238 |
| 2003/0006911 A1* | 1/2003 | Smith | G06Q 30/0239 705/14.66 |
| 2003/0065805 A1* | 4/2003 | Barnes, Jr. | G06Q 30/0643 709/244 |
| 2006/0228123 A1 | 10/2006 | Zaima | |
| 2007/0094279 A1 | 4/2007 | Mittal et al. | |
| 2007/0174259 A1 | 7/2007 | Amjadi | |
| 2007/0239722 A1 | 10/2007 | Phillips | |
| 2008/0086368 A1* | 4/2008 | Bauman | H04W 4/029 705/7.34 |
| 2008/0103887 A1 | 5/2008 | Oldham et al. | |
| 2008/0275894 A1 | 11/2008 | Charlton et al. | |
| 2008/0300985 A1 | 12/2008 | Shamp et al. | |
| 2009/0006194 A1 | 1/2009 | Sridharan et al. | |
| 2009/0089120 A1* | 4/2009 | Terui | G06Q 30/02 705/14.61 |
| 2010/0042493 A1* | 2/2010 | Nino | G06Q 30/0242 705/14.45 |
| 2010/0057573 A1 | 3/2010 | Singhal | |
| 2010/0094673 A1* | 4/2010 | Lobo | G06Q 30/0256 705/14.54 |
| 2010/0299202 A1* | 11/2010 | Li | G06Q 30/0251 705/14.49 |
| 2011/0029383 A1* | 2/2011 | Engel | G06Q 30/0261 705/14.69 |
| 2011/0099046 A1 | 4/2011 | Weiss et al. | |

OTHER PUBLICATIONS

Instant_Advertising_in_Mobile_Peer-to-Peer_Networks (Year: 2009).*
Advertisement system, method and computer program product (Year: 2006).*
An_interactive_terminal_for_the_design_of_advertisements (Year: 1979).*

* cited by examiner

FIGURE 8

| OFFER 802 - Sal's Drugstore |
|---|
| 804 TIME & LOCATION = 0 |
| ⬇ |
| OVERRIDE REMAINING FACTORS |
| ⬇ |
| TOTAL = 0 |

| OFFER 810 - Bajas |
|---|
| TIME & LOCATION = 20 |
| DURATION = 5 |
| DAY OF THE WEEK = 5 |
| MONTH OF THE YEAR = 5 |
| DATE = 5 |
| FREQUENCY = 10 |
| PRIOR REDEMPTION = 15 |
| USER PROFILE = 24 |
| ADVERTISEMENT PRIORITY = 10 |
| TOTAL = 99 |

| OFFER 820 - PURPLE PALACE |
|---|
| TIME & LOCATION = 20 |
| DURATION = 5 |
| DAY OF THE WEEK = 5 |
| MONTH OF THE YEAR = 5 |
| DATE = 5 |
| FREQUENCY = 10 |
| PRIOR REDEMPTION = 0 |
| USER PROFILE = 18 |
| ADVERTISEMENT PRIORITY = 8 |
| TOTAL = 76 |

| OFFER 830 - FUZZY'S TACOS |
|---|
| TIME & LOCATION = 6 |
| DURATION = 5 |
| DAY OF THE WEEK = 3 |
| MONTH OF THE YEAR = 1 |
| DATE = 1 |
| FREQUENCY = 4 |
| PRIOR REDEMPTION = 0 |
| USER PROFILE = 18 |
| ADVERTISEMENT PRIORITY = 30 |
| TOTAL = 68 |

SYSTEM AND METHOD FOR PROVIDING ADVERTISING CONTENT VIA MOBILE DEVICE DOCKING STATION

CROSS REFERENCE TO RELATED APPLICATION

This application is a Continuation-in-Part of U.S. patent application Ser. No. 12/510,645, filed on Jul. 28, 2009, entitled SYSTEM AND METHOD FOR PROVIDING ADVERTISING CONTENT VIA AN INTEGRATED HOME BASED DEVICE, the contents of which are incorporated herein.

BACKGROUND OF THE INVENTION

The disclosed embodiments are related to the field of advertising. Advertising is a form of communication that attempts to persuade potential customers to purchase a particular brand of product or service. Many forms of advertising exist including, but not limited to, television and radio commercials, infomercials, emails, newspapers, posters, billboards, and mass mailing of flyers. However, the majorit$_y$ of these types of advertisements are largely ignored by consumers. For example, with the advent of digital video recorders, the majority of television commercials are skipped during replay. Additionally, the majority of flyers received via mail are discarded immediately without the consumer taking notice of the advertisement. Further, these types of advertisements do not provide a convenient way to target a consumer's specific interest. Accordingly, the disclosed embodiments provide a system and method for providing advertising content to a consumer via an integrated home based device that overcomes one or more of the above identified problems.

SUMMARY OF THE INVENTION

Certain of the disclosed embodiments provide an in-home advertising device to individual consumers which will enable targeted offers. In some embodiments, the in-home advertising device utilizes a touch screen device for enabling a user to interact with the in-home advertising device. Additionally, in some embodiments, the in-home advertising device may include a built in printer for enabling a user to print an advertisement or coupon.

In certain embodiments, the in-home advertising device may contain an intuitive delivery interface that enables an individual consumer to choose content and/or receive targeted offers. In one embodiment, advertising partners target potential customers and provide varying levels of restitution based on the level of user activity and type of interaction.

Advantages of one or more of the disclosed embodiments include, but are not limited to, overcoming the current barriers to the mass appeal of mobile handset advertising while providing the inherent benefits. For example, in one or more embodiments, the in-home advertising device may facilitate a consumer's spending preferences and save the consumer money without being intrusive. One or more of the disclosed embodiments embrace and leverage the recent sentiment of "Going Green" (e.g., unwanted newspapers, flyers, mailers may be eliminated) and help consumers through challenging economic times. In one embodiment, the device is intended to be available in plain view and to provide easy access within the household (e.g., resting on a kitchen counter) and become a normal fixture of the residence. In addition, in one embodiment, the in-home advertising device is convenient in that it eliminates the need for a consumer to "log-in" or engage directly with a content server (i.e., push versus pull). Further, in certain embodiments, the in-home advertising device eliminates the need to "search" by automatically receiving the advertisements based on one or more user profiles or configuration settings. However, if desired, in some embodiments, the in-home advertising device may include search capabilities for locating a particular good or service.

Additionally, in some embodiments, the in-home advertising device receives daily updates for providing new offers in near real time. In some embodiments, the in-home advertising device may include data mining capabilities for automatically enabling the delivery of focused offers driven by a user's interaction with the in-home advertising device. In addition, in some embodiments, the in-home advertising device may provide advertisements based on the home location of the in-home advertising device and/or provide advertisements associated with businesses that are located along a commonly traveled route. For instance, wireless capability by location of device allows for targeted offers at any level of detail (user profile, state, city, zip, neighborhood and street). The in-home advertising device may update content choices as experience grows with system attributes and as new content providers are added. Content providers may fund execution by paying for various levels of utilization such as delivery of message views, an additional premium for printed offers, a premium for actual redemptions, as well as paying for data on consumer usage or profiles.

In certain embodiments, the in-home advertising device includes the capability for printing coupons that include information for identifying the particular in-home advertising device that printed the coupon. For instance, this information may be used for tracking coupon usage, eliminating fraud, and performing market research. Further, in certain embodiments, the waste stream associated with traditional methods of delivery of offers, e.g., newspapers, flyers, and mailers, may be eliminated.

Certain of the disclosed embodiments provide a distinct advantage and ability to overcome limitations over the current forms of wireless advertising. For example, the small screen size of a typical mobile handset is not user friendly for extended utilization and limits content display. In a preferred embodiment, the use of an in-home advertising device allows for a large touch screen which is fixed and viewable without having to hold or manipulate a smaller device's user interface. In addition, the touch screen may allow for the capability of full content display. Further, mobile handset consumers may acquire additional charges in connection with receiving unwanted text, data, or audio advertisements. Accordingly, certain of the disclosed embodiments provide for content delivery which is separate from any existing mobile handset pricing plan. Additionally, in one embodiment, the in-home advertising device receives content during off-peak hours or traffic times and stores the received content in memory. This enables a user to interact with the in-home advertising device without experiencing a slowdown in performance.

One or more of the disclosed embodiments create a seamless new revenue stream for the carrier partner while filling the gap from a network utilization perspective. In addition, privacy and personalization concerns inherent with a mobile handset may be reduced due to the fact that certain embodiments utilize a separate device for the specific purpose of facilitating the delivery of offer content. The in-home advertising device by default will therefore not intrude on or overlap with the private space inherent in the connection with the consumer's utilization of a wireless device.

Further, certain of the disclosed embodiments include the capability to ensure delivery and confirmation of viewing. For instance, in some embodiments, the in-home advertising device may track the printing of an offer, the redemption of an offer, or other user interaction with a particular advertisement or offer. In one embodiment, the in-home advertising device provides feedback to a network server on a daily basis by virtue of the continuous connection via the existing wireless networks.

BRIEF DESCRIPTION OF THE DRAWINGS

Illustrative embodiments of the present invention are described in detail below with reference to the attached FIGS., which are incorporated by reference herein and wherein:

FIG. 8 illustrates an example of a weighting scheme utilized to weight different offers to determine which offers to present to a user and the order in which they are to be presented.

DETAILED DESCRIPTION OF THE DRAWINGS

The disclosed embodiments and advantages thereof are best understood by referring to FIGS. 1-5 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and not intended to assert or imply any limitation with regard to the environment, architecture, design, or process in which different embodiments may be implemented.

Figure 1:
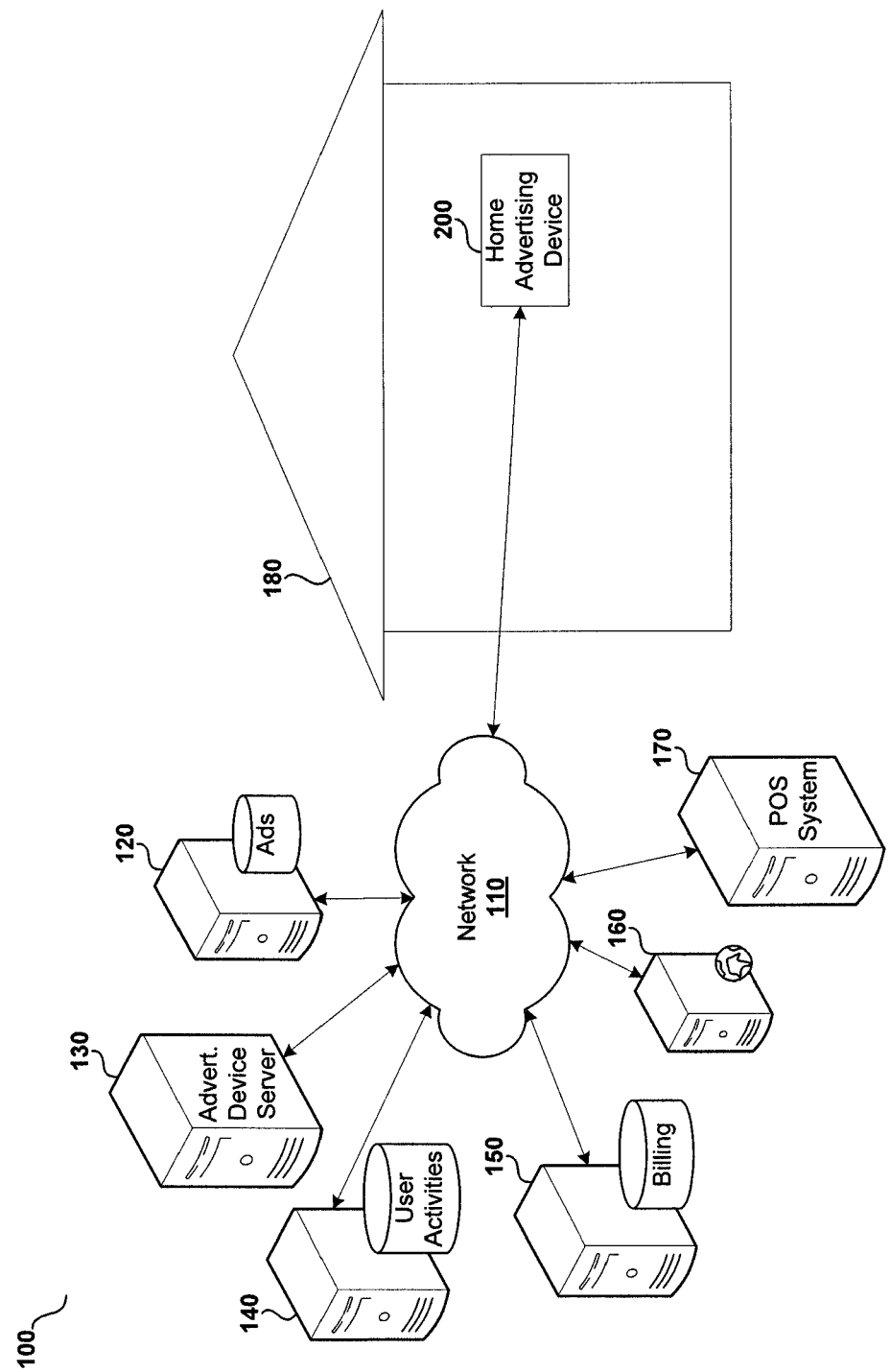
FIG. 1 depicts an embodiment of a network environment in which certain illustrative embodiments of the invention may be implemented.

FIG. 1 depicts an embodiment of a network environment 100 in which certain illustrative embodiments may be implemented. In one embodiment, an in-home advertising device, such as, but not limited to, in-home advertising device 200 is configured to receive advertising content from one or more network devices. As referenced herein, an in-home advertising device is defined as an electronic device that is utilized only within a home environment, such as, residential location 180, for the purpose of presenting advertisements/offers to a consumer. In-home advertising device 200 may be placed within any location within residential location 180. In a preferred embodiment, in-home advertising device 200 is placed in an open viewable space that is nonintrusive to a consumer, including, but not limited to, a kitchen counter. In some embodiments, in-home advertising device 200 is always on and/or may be configured to turn on and off at predefined, user-specified, or carrier-specified times. In other embodiments, a user may manually turn in-home advertising device 200 on and off as desired.

In a preferred embodiment, in-home advertising device 200 includes a wireless transceiver for receiving advertising content from one or more sources, including, but not limited to, a advertising device server 130 via network 110. Alternatively, as will be further described, in some embodiments, in-home advertising device 200 may include a wired network component, such as, but not limited to, an Ethernet network card and/or telephone modem for facilitating data transfer.

In one embodiment, network 110 is a cellular telephone network and in-home advertising device 200 communicates with cellular telephone network using a cellular communications protocol such as GSM or CDMA. In such an embodiment, in-home advertising device 200 may be assigned its own subscriber identity module (SIM) and associated SIM card. The SIM may include a mobile subscriber number such as an international mobile subscriber identity (IMSI). As described in further detail below, in this one embodiment, the use of a cellular network during off-peak periods of relative network inactivity allows wireless carriers to offer an advertising service pursuant to the teachings of the present invention with no additional bandwidth over the requirements of their current network and subscriber base. Such an embodiment allows wireless service providers to enhance revenue through the collection of advertising fees without any increase in infrastructure deployment or the expansion of their base of consumers. The use of a separate device and SIM card from a consumer's mobile telephone allows advertising content and collected advertising behavior to isolated from other personal information a consumer may store or create on their mobile telephone.

As referenced herein, network 110 may include one or more data networks, such as, but not limited to, the Internet, for routing communications between one or more communication devices and/or data processing systems. The Internet is a global system of interconnected computer networks that interchange data using the standardized Internet Protocol Suite (TCP/IP). In some embodiments, network 110 may include other types of data networks, such as, but not limited to, an intranet, a private local area network (LAN), a wide area network (WAN), and a wireless local area network (WLAN). In addition, in some embodiments, network 110 may include one or more cellular networks and/or a landline telephone networks for routing data between advertising device server 130 and other network devices. For example, in some embodiments, network 110 may include one or more GSM networks, CDMA networks, Enhanced Data GSM Environment (EDGE) networks, PSTN networks, and 3G/4G networks for facilitating data communications between the network devices/systems.

In one embodiment, in-home advertising device 200 may communicate directly, or indirectly through a WLAN or other access network, with a DSL, cable, or fiber network such as those used to deliver residential telephone, cable television, or Internet access to a home. Again, by utilizing such networks during off-peak periods of relative network inactivity, the needs of in-home advertising device 200 may be met without any increase in cost or network bandwidth.

In certain embodiments, in-home advertising device 200 collects feedback associated with a user's interaction and transmits the feedback to advertising device server 130 for facilitating dynamic advertising content based on a user's interest. In one embodiment, advertising device server 130 may store the data associated with a user's interaction with in-home advertising device 200 on a network database, such as, but not limited to, user activities database 140 of FIG. 1. Alternatively, in some embodiments, a user may configure in-home advertising device 200 to only retrieve/display advertisements relating to a particular category, store, brand, venue, and/or within a certain distance of a home location or alternative location associated with in-home advertising device 200.

In one embodiment, in-home advertising device 200 may communicate with a central server such as advertising device server 130. Advertising device server 130 may be a specially configured data processing system that provides personalized advertising content to one or more in-home advertising devices located within a plurality of homes. For instance, in one embodiment, advertising device server 130 may communicate with an advertisement database 120 for retrieving personalized advertisements based on a user profile and/or based on a user's interaction history. In one embodiment, advertising device server 130 transmits advertisements to in-home advertising device 200 only during off peak traffic times, such as, but not limited to, during the night. In such an embodiment, advertising device server 130 may monitor network traffic to assess available bandwidth between the individual in-home advertising device 200 and advertising device server 130 or another server providing ad content, for example. When such monitoring identifies an available window of bandwidth availability, advertising device server 130 may initiate an update process with in-home advertising device 200. Such monitoring may include the monitoring of line state, trunk state, packet loss, available bandwidth, latency, jitter, or any other metric of network availability or utilization. In one embodiment, a batched update process may be scheduled during known periods of network inactivity, such as 2 a.m. local time, or during such known periods of network inactivity unless a network fault or other performance condition has been identified in a network such as network 110.

In addition, in some embodiments, advertising device server 130 may facilitate the purchasing of goods or services associated with a particular advertisement. For instance, in some embodiments, a consumer may purchase goods and/or services using in-home advertising device 200 by transmitting a buy request to advertising device server 130. In these embodiments, advertising device server 130 may identify the user associated with the transmitting in-home advertising device 200 (e.g., using subscriber information associated with in-home advertising device 200), retrieve payment information associated with the identified user (e.g., stored credit card information), verify the transaction (e.g., the user must enter a pin/password using in-home advertising device 200), and place the order with a vendor (e.g., using a web site hosted by Web server 160). In addition, in some embodiments, advertising device server 130 may communicate with a billing server 150 for billing the vendor (i.e., the vendor pays a percentage and/or flat fee to the company that provides the in-home advertising device/service).

Similarly, as will be further described, in some embodiments, in-home advertising device 200 may include a built-in printer component for enabling a user to print a coupon associated with a particular advertisement offer. In one embodiment, the printed coupon may include embedded data, e.g., in the barcode, redemption code, printed RFID device, or other identifier that identifies the particular in-home advertising device or individual consumer that printed the coupon (referred to hereafter as ("consumer identifier"). In various embodiments, the consumer identifier may be a SIM card number, mobile identifier, telephone number, or customer account number. This particular feature may be used for tracking coupon usage, eliminating fraud, and conducting market research. For example, by using the consumer identifier, an advertiser may determine whether a coupon that is printed is redeemed, how long it took to redeem a coupon from the time of printing, and the demographics associated with consumers that utilize a particular coupon. For instance, in one embodiment, a point-of-sale (POS) data processing system 170 may report the use of a coupon generated by in-home advertising device 200 to advertising device server 130. In these embodiments, advertising device server 130 may match the embedded data on the coupon to a user profile for generating a market research analysis report as a paid service to the vendors/businesses. In some embodiments, advertising device server 130 may communicate with billing server 150 for billing a particular vendor/business based on the usage of a coupon.

In addition to being used to track coupon usage, collect market research, and bill advertisers, the consumer identifier may be utilized to assess the usage of in-home advertising device 200 by each consumer for billing purposes under various payment models. For example, in one embodiment a payment model may be utilized that offer the advertising service and associated in-home advertising device 200 to a consumer or household without charge, provided that they utilize so many coupons each billing period, spend so much money at advertisers during such billing period, or otherwise satisfy some other threshold associated with a metric of usage, spending, or redemption. Such threshold may be associated with a perceived break-even point or required revenue metric of either a service provider such as a wireless carrier or a company providing the advertising service itself. Such threshold may also be associated with a return on investment associated with the cost of in-home advertising device 200 itself. In one embodiment, a consumer is charged a marginal monthly fee for any month in which their usage of in-home advertising device 200 does not exceed an established threshold.

FIG. 1 is intended to illustrate only one network architecture in accordance with the disclosed embodiments. The disclosed embodiments may be implemented with other types of network architecture. For instance, in some embodiments, in-home advertising device 200 may communicate directly with one or more of the network devices/systems, such as, but not limited to, advertisement database 120, billing server 150, and/or Web server 160 for providing advertising content to a consumer and facilitating the sale of goods or services to consumer without the use of a central server.

Figure 2:
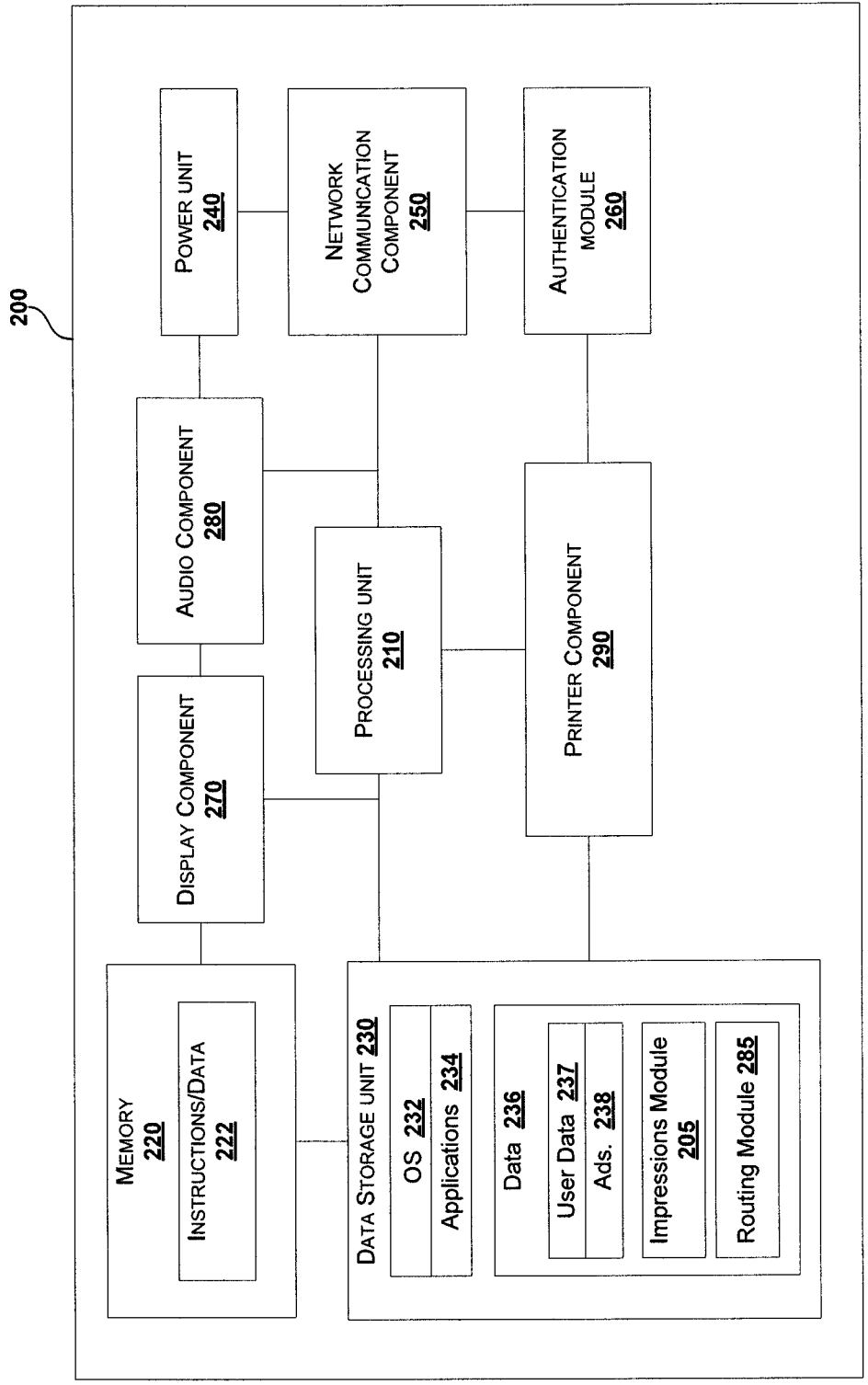
FIG. 2 depicts internal components of an embodiment of an in-home advertising device in accordance with certain embodiments of the invention.

FIG. 2 depicts internal components of an embodiment of in-home advertising device 200 in accordance with certain embodiments of the invention. In the depicted embodiment, in-home advertising device 200 includes, but is not limited to, a processing unit 210, a memory component 220, data storage unit 230, a network communication component 250, an authentication module 260, a display component 270, an audio component 280, and a printer component 290. In one embodiment, the depicted components communicate using conductive pathways, or traces, etched from copper sheets laminated onto a non-conductive substrate. However, in alternative embodiments one or more components may be integrated on a printed circuit board, application specific circuit, microprocessor, microcontroller, multi-chip module, or other combination of systems or components.

Processing unit 210 is operable to execute computer executable instructions stored in memory 220 and/or data storage unit 230. In one embodiment, processing unit 210 may include one or more processing cores, such as, but not limited to, a microcontroller, microprocessor, or a graphics processing unit, for executing instructions and processing data for providing advertising content to a consumer and for facilitating feedback to advertising device server 130.

In one embodiment, memory 220 is volatile memory. Volatile memory is memory that requires power to maintain stored information. For example, in some embodiments, memory 220 may be random access memory (RAM). Random access memory stores currently executing instructions and/or other data 222 utilized by an operating system 232, software applications 234 and/or other components of in-home advertising device 200. Alternatively, memory 220 may be or include nonvolatile memory.

In one embodiment, in-home advertising device 200 includes nonvolatile memory such as data storage unit 230. For example, in one embodiment, data storage unit may be a hard drive. In other embodiments, data storage unit 230 may be flash memory, such as, but not limited to, an xD (extreme Digital) card, SD (Secure Digital) card, or mini SD card. In some embodiments, data storage unit 230 may be removable and/or an interchangeable with other devices. Additionally, in some embodiments, data storage unit 230 may store computer executable instructions, such as, but not limited to, operating system 232, software applications 234. In addition, in some embodiments, data storage unit 230 may store other types of data 236 including, but not limited to, a user data file 237 and advertisements 238. In some embodiments, user data file 237 may include user configuration settings/preferences, a user profile, user interactivity data, and billing information.

In some embodiments, advertisements 238 may include passive and/or interactive advertising content. In a preferred embodiment, advertisements 238 are updated on a daily basis during off-peak hours. By storing advertisements 238 locally, in-home advertising device 200 provides fast display and interactive response times to a consumer. In addition, by retrieving advertisements 238 during off peak hours, in-home advertising device 200 is able to communicate with network devices in real time, if necessary, without the traffic congestion caused by the downloading of advertising content. The use of off-peak hours may further reduce or eliminate any incremental costs of deploying an advertisement service to a network provider such as a wireless carrier as excess network capacity exists during off-peak hours.

Display component 270 provides a means for displaying advertising content to a consumer. Display component 270 may use LCD, LED, OLED, plasma, electronic ink technologies, or other suitable display technology for displaying advertising content to a consumer. In a preferred embodiment, display component 270 includes touch screen capabilities for enabling a user to interact with in-home advertising device 200 by touching the screen. For example, as will be further described, in some embodiments, in-home advertising device 200 may display one or more soft keys for enabling a user to select features associated with in-home advertising device 200 and/or an advertisement. In addition, in some embodiments, in-home advertising device 200 may include audio component 280 for providing audio to a consumer, such as, but not limited to, voice interactivity and/or audio associated with advertising content.

In addition, in-home advertising device 200 may also include a power unit, such as, power unit 240. In one embodiment, power unit 240 converts the input power from an AC adaptor to run various components of in-home advertising device 200. In addition, in some embodiments, power unit 240 may include an internal power source, such as, but not limited to, a battery.

In one embodiment, network communication component 250 includes a wireless transceiver for receiving advertising content from one or more sources, such as, but not limited to, a advertising device server 130 via network 110. For instance, in one embodiment, network communication component 250 may communicate wirelessly with a 3network for retrieving advertising content. Alternatively, in some embodiments, network communication component 250 may communicate via a wireless Internet router/access point for accessing network 110. Further, in some embodiments, network communication component 250 may include a wired network component, such as, but not limited to, an Ethernet network card and/or telephone modem for facilitating data transfer via a cable connection.

In one embodiment, in-home advertising device 200 includes an impressions module 205. Impressions module 205 stores information with regard to which advertisements are presented on in-home advertising device 200. Impressions module 205 may also store information with regard to which advertisements are selected by a user, flagged for later follow-up, printed, or redeemed with a merchant. Such categories of information may be referred to generally as impressions relative to when they are performed on a particular advertisement. Impressions module 205 may store impressions information relative to each advertisement presented over in-home advertising device 200, providing a useful tool for an operator of advertising services or a merchant to ascertain the interests of a consumer and the appeal of certain advertisements. Impressions module 205 may also store cumulative information on impressions relative to the consumer to gauge the extent to which the consumer is utilizing in-home advertising device 200. In one embodiment, in-home advertising device has a different access button for each member of the household allowing impressions for each household member to be tracked and advertisers to target particular advertisements to particular members of the household. In such an embodiment, the consumer identifier referred to herein may include individual household member identifiers specific to an individual.

In certain embodiments, in-home advertising device 200 may include authentication module 260. Authentication module 260 may comprise hardware, software, and/or a combination thereof for authenticating/identifying in-home advertising device 200 to a third party. For instance, in one embodiment, authentication module 260 may be used to encrypt and/or decrypt a data sequence for verifying the authenticity of in-home advertising device 200. For example, in some embodiments, authentication module 260 may be used to authenticate in-home advertising device 200 as part of a consumer purchase request.

In one embodiment, in-home advertising device 200 may also include a routing module 285. In one embodiment, routing module 285 is an application specific integrated circuit or portion thereof. Alternatively, routing module 285 may include logic and memory executable and accessible respectively by a processor or controller. Routing module 285 stores location information associated with one or more users of in-home advertising device. For example, routing module 285 may store a home location that designates the address where in-home advertising device 200 is located. Routing module 285 may also store work or school addresses where the members of a household frequently travel to and from. Routing module 285 may also store addresses of friends or relatives. Routing module 285 may also store locations associated with scheduled appointments or calendar entries for one or more members of the household. Routing module 285 may utilize an interface such as an XML interface where data from other applications such as calendar and appointment applications may be received and translated into location information suitable for storage by routing module 285. Routing module 285 may also store information on one or more routes between each of the stored locations. Such routes may include information on streets traveled, intersections encountered, freeways utilized, preferences for highways or non-highways utilized, preferences on toll-road usage, or any other suitable information on a route taken or directions therefor. For example, routing module 285 may store route information between a home location and each of the other stored locations, referred to herein as primary routes. Routing module 285 may also store information between each of the other stored locations and each other, referred to herein as secondary routes. Secondary routes take into account the fact that when traveling to or from a stored location, a consumer may not necessarily be traveling directly to or from a home location. Instead, a parent may travel from work to a school. Likewise, a child may travel from school to gymnastics practice. Each of the locations and routes may be used to target advertising to the in-home advertising device 200 by merchants that happen to have locations at such locations or along such routes. Routes can be combined with day of the week, date of the month, or time of day logic to present advertisement via in-home advertising device 200, particularly when combined with knowledge obtained from a calendar or appointment application. Routing module 285 may include its own mapping software or may interface with a remote mapping software or search engine application. In one embodiment, routing module 285 is located remote from in-home advertising device 200 at advertising device server 130 or elsewhere.

Additionally, in one embodiment, in-home advertising device 200 includes a built in printer component 290. Printer component 290 may utilize any type of suitable print technology including, but not limited to, ink-jet, laser, dot-matrix and thermal printers. In one embodiment, in-home advertising device 200 may indicate to a service provider or operator of an advertising service when in-home advertising device 200 is running low on consumables such as ink or paper. For example, advertising device server 130 may receive a message from in-home advertising device 200 when an ink level or spooled paper roll has fallen below a predetermined threshold. Optical and other sensor mechanisms are well known in the printing art that could be adapted for this purpose. Such message may automatically trigger the ordering and shipment of such consumables through an automated inventory retrieval or fulfillment system to the address associated with in-home advertising device 200.

Figure 3:
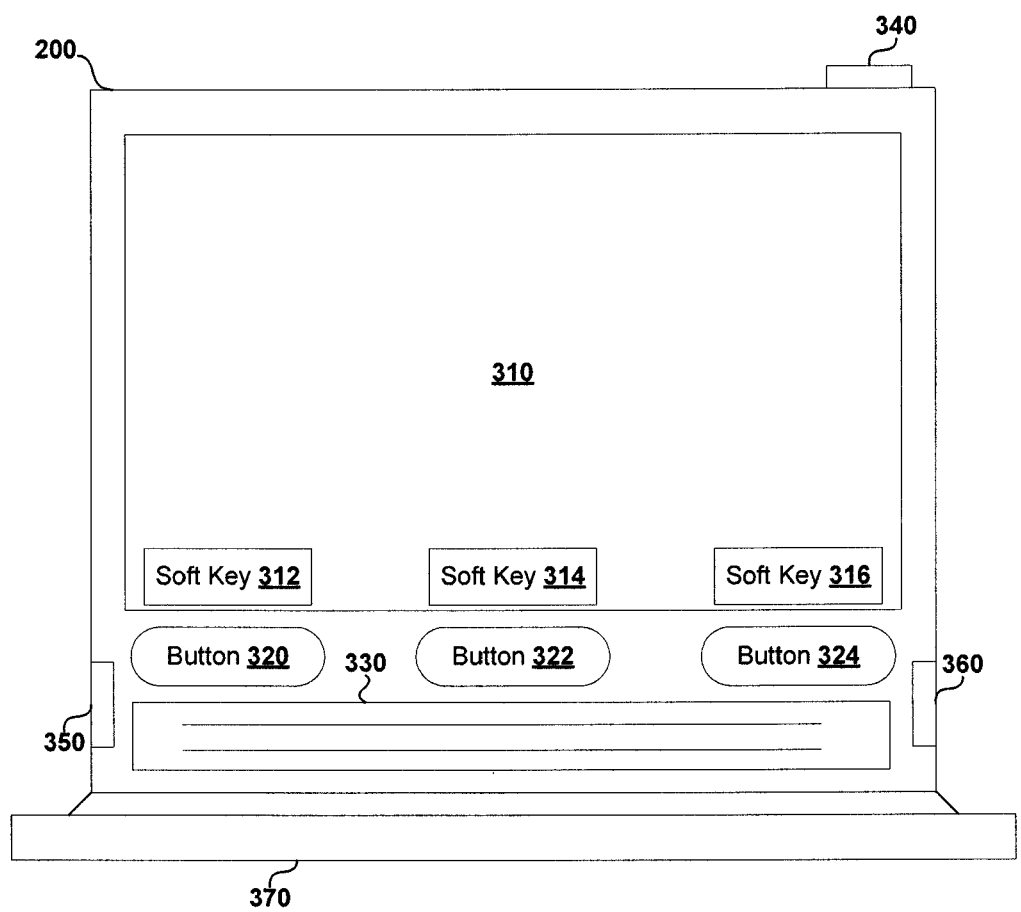
FIG. 3 depicts an external view of an embodiment of an in-home advertising device in accordance with certain embodiments of the invention.

FIG. 3 depicts an external view of an embodiment of in-home advertising device 200 in accordance with certain embodiments of the invention. In the disclosed embodiment, in-home advertising device 200 includes a touch screen display 310. Touch screen display 310 enables a user to interact with in-home advertising device 200 by simply touching certain displayed areas of the screen. In one embodiment, in-home advertising device 200 includes an antenna 340 or other interface for communications with various networks and devices. For example, in one embodiment, in-home advertising device 200 may display one or more soft keys, such as, but not limited to, soft key 312, soft key 314, and soft key 316 associated with a user interface of in-home advertising device 200. In some embodiments, soft key 312, soft key 314, and soft key 316 may be associated with static functions/features associated with in-home advertising device 200. In other embodiments, the functions/features associated with soft key 312, soft key 314, and soft key 316 may dynamically change based on the user interface of in-home advertising device 200 and/or based on a displayed advertisement.

In addition, in some embodiments, in-home advertising device 200 may include one or more hard keys (i.e., physical keys), such as, but not limited to, button 320, button 322, and button 324. In these embodiments, button 320, button 322, and button 324 may be associated with set features or functions associated with in-home advertising device 200. For instance, in one embodiment, button 320, button 322, and button 324 may respectively be a "Print" button, a "Buy" button, and a "More Info" button.

In the depicted embodiment, in-home advertising device 200 includes a printer component 330 below the set of hard keys. However, in other embodiments, printer component 330 may be placed anywhere on in-home advertising device 200 including, but not limited to, above the set of hard keys, above the display screen, and/or to either side of in-home advertising device 200.

Additionally, in one embodiment, in-home advertising device 200 may include one or more visible speakers 350 for outputting audio associated with the user interface of in-home advertising device 200 and/or audio of advertisements. In addition, in some embodiments, in-home advertising device 200 may be supported by an adjustable stand 370.

Figure 4:
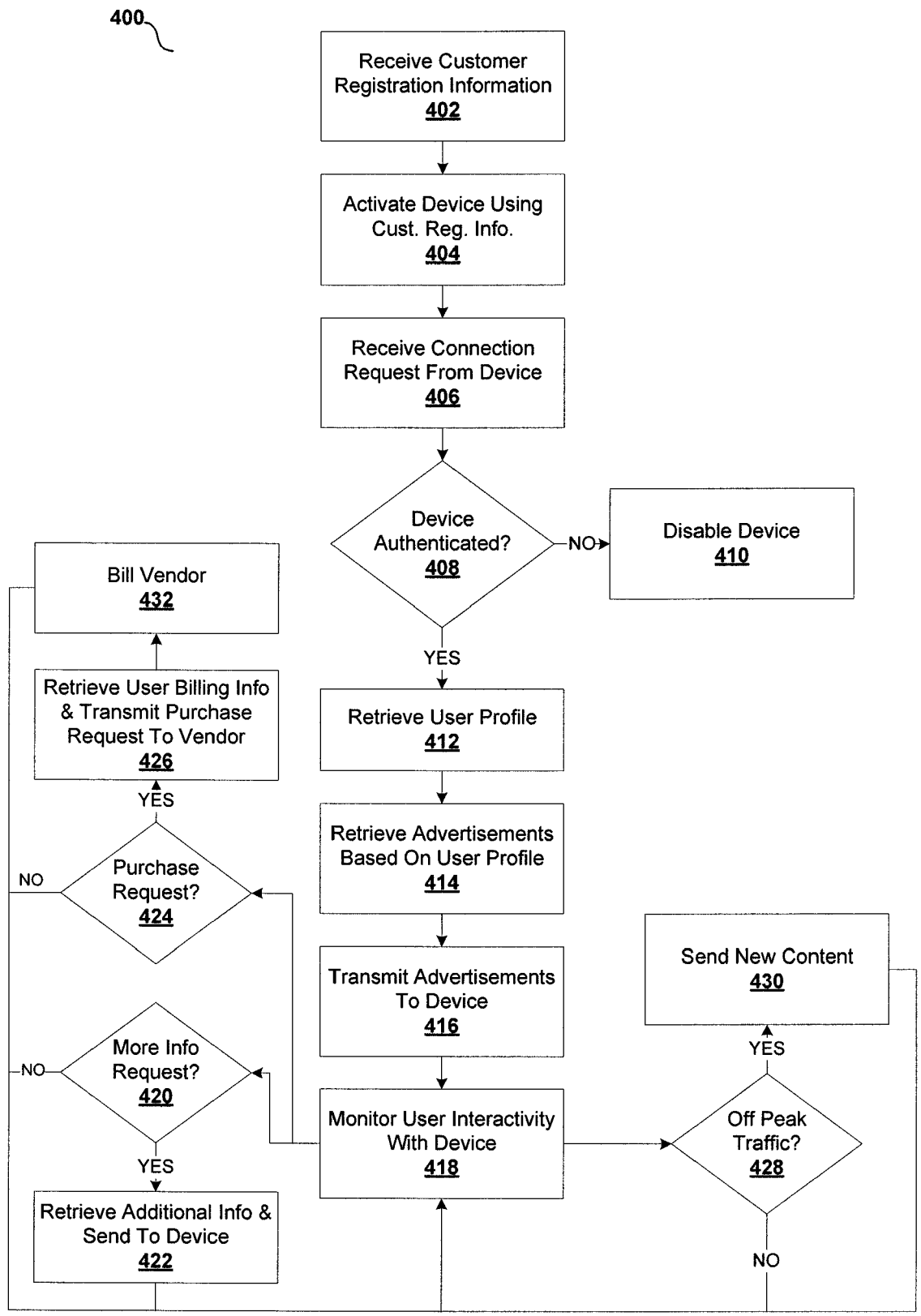
FIG. 4 depicts an embodiment of a process for providing advertising content to an in-home advertising device in accordance with certain embodiments of the invention.

With reference now to FIG. 4, a process 400 for providing advertising content to an in-home advertising device is depicted in accordance with the illustrative embodiments. Process 400 may be executed by a data processing system or network server, such as, but not limited to, advertising device server 130. Process 400 begins by receiving customer registration information at step 402. For instance, in one embodiment, the network server receives the customer information including, but not limited to, a user's name, address, and billing information via a user entering the information into a Web site, or via a store sales personnel entering the information to a network data processing system, and/or via a call center support technician receiving the information from a user over the telephone or from previously existing customer account information. Once the information is entered and verified, in step 404, the process activates an in-home advertising device, such as in-home advertising device 200, using the consumer registration information.

The process then waits for a connection request from the activated in-home advertising device. For example, the in-home advertising device may be mailed to a user's home address and/or a user may pickup an in-home advertising device from a particular retailer. In either case, once the activated in-home advertising device is taken home and turned on, the in-home advertising device transmits a connection request to the network server via a network. At step 406, the process receives the connection request from the activated in-home advertising device. The process, at step

408, authenticates the device using data received as part of the connection requests. For instance, in one embodiment, the process determines the physical location of the in-home advertising device using cellular triangulation, GPS, and/or IP address to verify that the in-home advertising device is located in the correct physical location associated with the address of the registered consumer. In one embodiment, if the process determines that the in-home advertising device is located in a different location than the location associated with the address of the registered consumer, the process disables the device at step 410. In such embodiments, the process may display a help number/call center number on the display screen of the in-home advertising device for enabling a person to call for assistance.

In one embodiment of the disclosed invention, an in-home advertising device may be utilized in more than one location. For example, if a consumer moves and transfers residential addresses, the new location of the in-home advertising device may be determined using cellular triangulation, GPS, or IP address. In such an embodiment, in-home advertising device may itself automatically communicate its new location to a server such as advertising device server 130. Advertising device server 130 may then alter the advertisements sent to the consumer in response to the new geographic location associated with the home location of the in-home advertising device. In one embodiment, in-home advertising device may determine its new location each time it is powered on, when a "new home location" or similar option is selected by a user, or after a material change in location is detected. In a similar manner, in-home advertising device may be moved to a vacation home, office, or other location and still operate without having to re-register for the advertising service.

If the process verifies the location of the in-home advertising device, the process, at step 412, retrieves the user profile associated with the registered consumer. At step 414, the process retrieves advertisements based on the retrieved user profile. The process transmits the retrieved advertisements to the in-home advertising device at step 416. The process, at step 418, monitors for user interactivity with the in-home advertising device. For example, the process may receive a purchase request, at step 424, to purchase a good and/or service associated with a displayed advertisement. In this scenario, the process, at step 426, retrieves the billing information associated with the registered consumer and transmits the purchase request to a vendor. In one embodiment, the process, at step 432, bills the vendor for a percentage or flat fee associated with the purchase request.

Alternatively, in some embodiments, the process may, at step 420, receive a request for additional information associated with a good/service corresponding to a displayed advertisement. In these embodiments, the process, at step 422, retrieves the additional information, either locally and/or from a remote network device, and transmits the retrieved additional information to the in-home advertising device.

In one embodiment, the process, at step 428, monitors the network traffic for determining the off-peak traffic times. If the process determines that the network traffic is light, the process, at step 430, retrieves and transmits updated/new content to the in-home advertising device.

Figure 5:
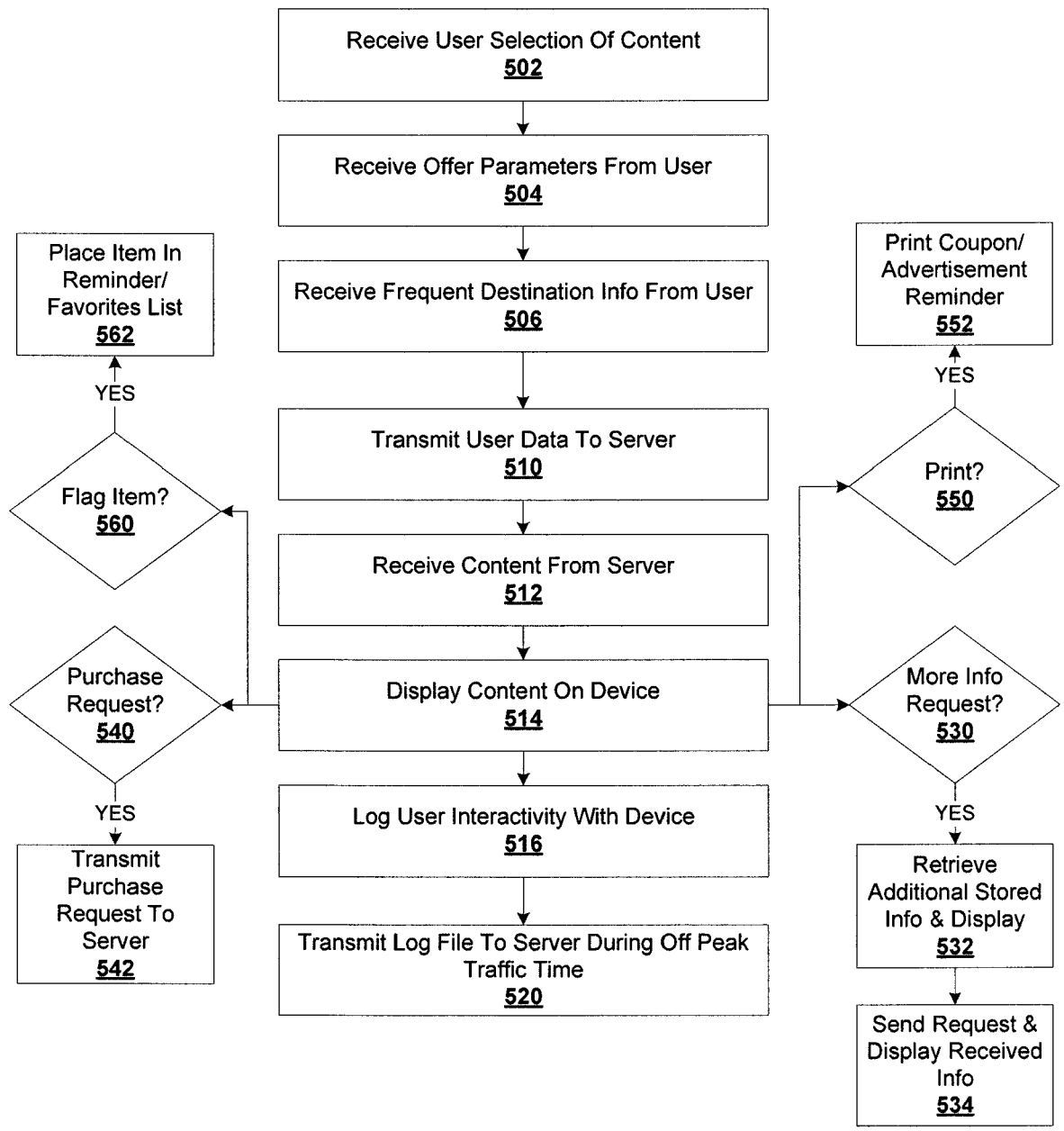
FIG. 5 depicts an embodiment of a process for providing advertising content to a consumer in accordance with certain embodiments of the invention.

FIG. 5 depicts a process 500 for providing advertising content to a consumer in accordance with certain illustrative embodiments. Process 500 may be executed by an in-home advertising device, such as, but not limited to, in-home advertising device 200 depicted in FIGS. 2 and 3. FIG. 5 begins by receiving user selection of content at step 502. For example, in one embodiment, a user may select advertising content based by category (e.g., clothes, music, travel), by brand (e.g., Nike® shoes), by store name (e.g., Banana Republic®), by location (e.g., with 25 miles from home location), and by topic (hot fashion trends and/or newest tech toys). Additionally, in some embodiments, a user may select a particular date, e.g., anniversary, or a range of dates to receive advertisements and/or coupons associated with events occurring on the specified date and/or within the range of dates.

In addition, in some embodiments, process 500, at step 504, may receive user configured offer parameters. For instance, in one embodiment, a user may configure an in-home advertising device to display all advertising content associated with a selected category. Alternatively, in some embodiments, a user may configure an in-home advertising device to only display advertisements from a selected list (i.e., an opt-in list). Further, in some embodiments, a user may configure an in-home advertising device to not display advertisements from a banned list of advertisers (i.e., an opt-out list). Additionally, in some embodiments, a user may configure an in-home advertising device to receive updates only during a specified period of time and/or only every other day (or any other specified period of time). Further, in some embodiments, a user may configure an in-home advertising device to display each advertisement only a certain number of times and may also configure the display rate for such advertisements.

In addition, in some embodiments, the process, at step 506, may receive one or more frequent destination addresses/places of interest associated with a consumer. For example, in one embodiment, a user may enter a user's work address, a school's address, one or more friends' or relatives' addresses, the address of a local gym, and/or the address of a grocery store. In one embodiment, the process determines the travel route information from the user's home location to the one or more frequent destination addresses and retrieves advertising content associated with businesses along the determined travel routes. In one embodiment, the process interacts with local mapping programs, search software, or Internet resources to determine such travel routes. In one embodiment, the process may interact with a calendar or electronic appointment book to determine a consumer's destinations on a particular day or week. For example, the process may offer certain advertisements based on the day of the week and predicted routes to be taken to church, work, the gym, or another location. The process may also offer certain advertisements based on specific calendar entries or appointments. For example, if a calendar shows a lunch appointment the next day with a client having an address in a neighboring city, the process may select advertisements for restaurant locations near such client's offices. If a calendar shows a planned trip out of town for a vacation or business trip, the process may offer certain advertisements two weeks ahead of time advertising hotels at the trip's location and restaurants an entertainment venues at the trip's location in the days leading up to the scheduled date of departure.

Unlike advertising services that determine your location or predicted route via your wireless telephone or GPS system as you drive to other locations in your car, the disclosed advertising service does not require someone to interact with a system while in transit, which can create safety and distraction issues, as well as practical concerns. Getting a notification of an advertisement as a consumer drives by or towards a particular merchant has a particularly low rate of success, because of the required attention to driving, the inability to recognize when an advertisement is received, and the relatively low likelihood that a consumer will wait until the last minute to plan or change their schedule or their intended destination. One or more embodiments of the present invention address these disadvantages while still achieving the advantages of such systems. By plotting a consumer's likely routes for the next day each night or on an otherwise regular basis, merchants along those routes can still highlight their businesses and options to consumers and display them to the consumer on a convenient device before they leave the house. The advertisements are not received when a consumer is likely to be distracted or occupied while in transit. The advertisements are received far enough in advance to allow planning yet with immediacy and proximity to the transit or travel planned for that day. The advertisements are also not passively displayed on a device that a consumer is unlikely to pay attention to while in transit.

In other embodiments, the process, at step 510, transmits the user configuration information to a network data processing system, such as advertising device server 130, for enabling the network server to process the information and retrieve the appropriate advertising content. In these embodiments, the process, at step 512, receives the appropriate advertising content from the network server. The process, at step 514, displays the received advertisements on the display component of the in-home advertising device. In response to displaying an advertisement, the process monitors for user interactivity with a particular advertisement. For example, in one embodiment, the process, at step 530, may receive a request for additional information associated with a displayed advertisement. If the additional information is stored locally, the process, at step 532, retrieves the store information and displays the information on the display component of an in-home advertising device. Alternatively, if the additional information is not stored locally, the process at step 534 transmits a request for the additional information to a network server and displays the received information.

In some embodiments, the process may, at step 540, receive a request to purchase a good or service corresponding to a displayed advertisement. If the process receives a purchase request at step 540, the process transmits a purchase request to the network server at step 542.

In a preferred embodiment, the process may, at step 550, receive a request to print a coupon and/or an advertisement corresponding to a displayed content. If the process receives a print request, the process prints the coupon and/or advertisement corresponding to the displayed advertisement using the internal printer associated with an in-home advertising device. For example, a user may want to print an advertisement as a reminder to purchase a particular product.

Alternatively, in some embodiments, process 500 may include an option for flagging a particular advertisement. For instance, if the process receives a flag item request at step 560, the process may place the advertisement in a reminder/favorites list at step 562. In some embodiments, a user may configure an in-home advertising device to display advertisements in a reminder/favorites list periodically and/or to display one or more of the advertisements within the reminder/favorites list more often than other advertisements.

Additionally, process 500, at step 516 logs user interactivity with an in-home advertising device. For instance, process 500 may keep a log file of all coupons for a user printed and/or goods/services a user purchases using an in-home advertising device. In one embodiment, the process, at step 520, transmits the log file to a network server during off-peak traffic times. In one embodiment, information on purchases made using coupons printed from an in-home advertising device may also be logged. In such an embodiment, when coupon information is entered via a merchant's point-of-sale systems or otherwise collected by a merchant, such coupon information will include the consumer identifier. When the coupon information is communicated back to an operator of advertising services provided using an in-home advertising device, the coupon information may be combined with the log file previously communicated to the network server, allowing a complete picture of behavior of a consumer's interaction with an in-home advertising device to be obtained.

The logging of consumer behavior facilitates the adoption of various merchant billing models by a provider of advertising services. For example, various weighting of consumer activities may be utilized to bill a particular advertiser. One or more categories of impressions or other consumer activities may be utilized to facilitate such weighting. Such categories may include each time an advertisement is displayed, each time an advertisement is selected or flagged for further follow-up, each time an advertisement is printed, and each time an advertisement is redeemed as a coupon or selected to make a purchase. In one basic embodiment, one point may be assigned for each display, two for each follow-up, three for each printing, and four for each redemption, with the merchant being billed based on the total number of points accumulated for that merchant across a particularly consumer market. Points may be further weighted based on location, household income, order or position of display on an in-home advertising device, purchase amounts when coupons are redeemed, or any other suitable criteria.

Accordingly, certain of the disclosed embodiments present a system and method for providing in-home targeted advertisements to individual consumers. For instance, the disclosed embodiments include an in-home advertising device that enables a user to interact with the in-home advertising device and purchase items with the push of a button. Additionally, in some embodiments, the in-home advertising device may include a built in printer for enabling a user to print an advertised and/or coupon. The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function(s).

In some alternative implementations, the functions noted in the block may occur out of the order noted in the figures and/or may be omitted. For instance, in some embodiments, process 500 may alert the appropriate personnel of an unauthorized cellular device without blocking cellular communications associated with unauthorized device. In addition, two blocks shown in succession may, in fact, be executed substantially concurrently, or the blocks may sometimes be executed in the reverse order, depending upon the functionality involved. Further, in some embodiments, each block of the block diagrams and/or flowchart illustration, and combinations of blocks in the block diagrams and/or flowchart illustration, may be implemented entirely with hardware or as a software embodiment (including firmware, resident software, micro-code, etc.) or an embodiment combining software and hardware aspects for performing the specified functions or acts.

Additionally, computer program instructions for executing the disclosed embodiments may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a data processing apparatus to cause a series of operational steps to be performed on the data processing system to produce a computer implemented process such that the instructions which execute on the data processing system provide processes for implementing the functions/acts specified in the flowchart and/or block diagram block or blocks.

Figure 6:
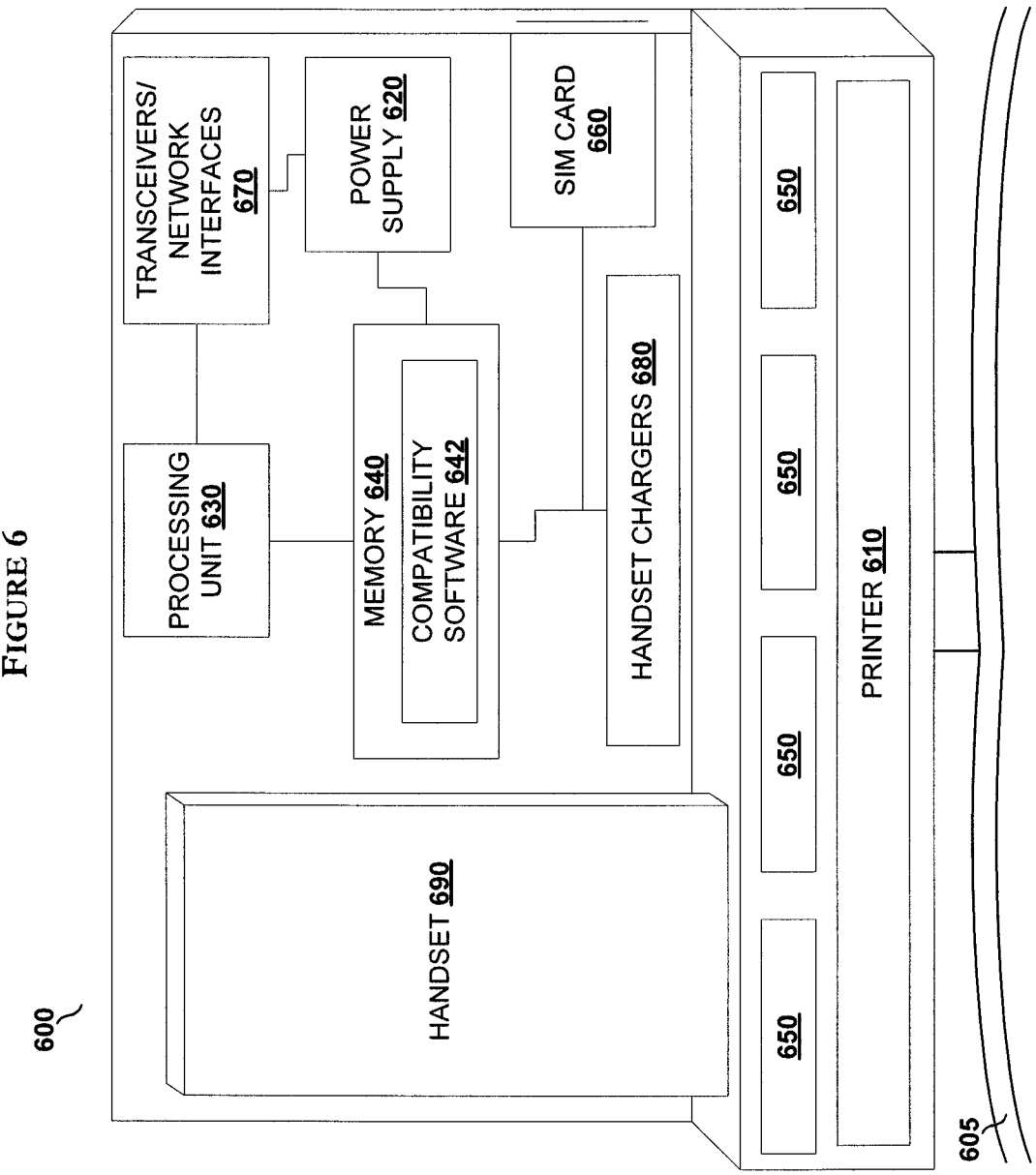
FIG. 6 depicts an embodiment of a docking station in accordance with certain embodiments of the invention.

FIG. 6 depicts an embodiment of a docking station 600 according to the teachings of the present invention. Docking station 600 is a cradle or other device for receiving an electronic device such as handset 690. The handheld electronic device may be a cordless telephone, a wireless handset, a laptop, an electronic tablet, an e-reader, or any other suitable wireless device utilized to present one or more features of the present invention. Although docking station 600 is illustrated and described in this FIG. 6 as a cradle or other receptacle for receiving a device such as handset 690, docking station 600 may instead not directly receive an electronic device such as handset 690, and may instead communicate with a device such as handset 690 using other interfaces or communications media. For example, docking station 600 may connect to a handset 690 using a USB cable or may communicate wirelessly with a handset 690 using a wireless protocol such as a Wi-Fi protocol. For example, docking station 600 may communicate with an iPad® using a USB connection or wireless network interface.

Docking station 600 includes a printer 610. Printer 610 may be a printer component such as that described in FIG. 2 relative to printer component 290. As previously described, printer 610 may be monitored to determine the level of consumables such as ink or paper that may need to be replenished by the provider of docking station 600.

Docking station 600 may be disposed on a flexible stand 605 such that the vertical or horizontal orientation and/or angle of docking station 600 and any connected handset 690 may be varied for user access or viewing.

Docking station 600 includes a power supply 620. Power supply 620 may be a power supply such as that described relative to power unit 240 of FIG. 2. Docking station 600 further includes a processing unit 630 and a memory 640. Processing unit 630 may be any suitable processing device or module such as the embodiments described with respect to processing unit 210 of FIG. 2. Similarly, memory 640 may include any combination of volatile and/or nonvolatile memory such as that described relative to memory 220 and data storage unit 230 of FIG. 2.

Docking station 600 may include one or more smart keys 650 to allow a user of docking station 600 to easily discern, select, and actuate the primary functions of docking station 600. For example, one of smart key 650 may be a print button that causes docking station 600 to print a currently selected or viewed ad, coupon, or offer displayed on handset 690. Additionally, one of smart key 650 may allow easy navigation of the display of handset 690 without the use of the user interface of handset 690 itself. Smart keys 650 may also be utilized to perform any of the other functions associated with the inventions described herein.

Docking station 600 also includes a SIM card 660. SIM card 660 is a subscriber identity module utilized to allow communication with an external wireless network that is specifically targeted to docking station 600. For example, SIM card 660 may utilize an identifier such as an electronic serial number, international mobile equipment identity, or an integrated circuit card ID. In one embodiment, docking station 600 is registered with a cellular communications network in a similar manner to a mobile handset or other wireless device. Thus, SIM card 660 allows docking station 600 to transmit and receive communications over a network using its own unique registered address. The nomenclature of SIM card 660 is used for convenience only, and is not intended to limit the teachings of the present invention to any particular type of module, component, or identification method. In such a manner, docking station 600 may communicate with a cellular network, for example, independent of any handset 690 or other device that may be docked into or otherwise associated with docking station 600. To facilitate such communication, docking station 600 also includes one or more transceivers 670 or network interfaces to allow communication with wireless networks or wired networks such as a cellular network, a Wi-Fi network, an Ethernet network, a cable network, a satellite network, or any other suitable network for communicating with docking station 600.

Docking station 600 further includes at least one handset charger 680 that may utilize an interface such as a USB interface to charge and/or communicate with handset 690 or another wireless device. Handset charger 680 may, in one embodiment, include multiple formats and configurations of interfaces such that it is able to communicate with handsets from different manufacturers. In one embodiment, docking station 600 is equipped with more than one of the same kind or different kinds of handset chargers 680 to support multiple members of the household and their associated handsets. In such a manner, docking station 600 may serve as a hub for docking several handsets at the same time.

In one embodiment, docking station 600 may be a hexagonal base having six handset chargers 680 and adapted to receive six different handsets 690. In one embodiment, docking station 600 is equipped with a rotational base, either integrated with or separate from flexible stand 605, such as a base configured in a lazy-susan manner to allow docking station 600 to be rotated such that any member of the household can rotate docking station 600 to a suitable position such that the display of their particular handset 690 is oriented in a particular direction.

To support multiple handsets 690, other electronic devices, and multiple manufacturers of devices, docking station 600, and in particular memory 640, may store compatibility software 642, which includes software interfaces, maps of directory structures, and routines for interfacing with each of a plurality of handsets 690, including handsets of various models and manufacturer. In one embodiment, compatibility software 642 may be updated periodically via information received from an external network over transceiver 670 to ensure that docking station 600 remains compatible with the most recent releases of handset 690 and other compatible electronic devices.

While docking station 600 may offer many of the same benefits, features, and functionality described in previous embodiments of the present invention, docking station 600 also allows the targeting of individual consumers rather than a household as a whole. Such differentiated targeting of household members allows much more granularity of information regarding the habits, preferences, and needs of an individual household member. Such additional granularity allows advertising targeted to such household member to be much more focused, and ultimately much more successful. Not only can such targeting take into account basic demographics frequently used in advertising such as gender, age, indicated preferences, and other profile characteristics, but it also allows offers to be targeted to an individual household member that are based on the individual itinerary, schedule, destinations, and shopping and purchase histories of that individual. For example, individual profiles of each household member can be tied to a wireless handset or other wireless device identifier such as a SIM card or other indicator of association with an individual household member. A particular device such as handset 690 can be attached to docking station 600 and registered as belonging to a particular household member that may be assigned a particular label for convenience such as, for instance, Dad, Mom, an individual name, nickname, number, or any other alphanumeric, symbolic, or picture-oriented identifier. Alternatively, no individual registration needs to take place and docking station 600 may build a profile over time based on the interface of such handset 690 to docking station 600 without identification of a specific individual required.

In one non-limiting example of the benefit of utilizing docking station 600, a handset 690 equipped with GPS services or other location or positioning-based services may be utilized to track the individual routes of each household member as they go about their daily routine. In such a manner, the location of a job, school, frequented retail location, or other destination does not need to be separately entered or identified. Instead, docking station 600 can react at the end of each day based on the individual routes of each household member as determined by each handset 690. Such routes may be communicated from handset 690 to docking station 600 and/or an external server maintaining a profile of each household member and subsequently used to modify and/or fine-tune offers generated and presented to each individual household member. For example, docking station 600 would not need to be informed that a parent no longer picks up children from a particular school location each weekday Monday through Friday once summer has arrived. Instead, changes in the locations visited by such parent would be readily apparent based on location information transferred from the handset 690 to the docking station 600 each night once handset 690 is docked to docking station 600. For example, in one embodiment, handset 690 could be loaded with an application that records the location of any position in which the handset 690 remains in the general vicinity of for at least five minutes. Such locations could then be logged as destinations and communicated to docking station 600 and/or an external server and used to formulate new offers. Such offers could be generated based on the recognition of changes in a daily routine, the number of times a particular location is visited, or locations lying between the location of docking station 600 and each of these other determined locations. Patterns of travel may also be recognized in response to such locations. For example, a visit to a particular location every Tuesday may spark offers targeted to that location to be presented each Tuesday morning.

In yet another embodiment, docking station 600 may sync with applications on a handset 690 such as a calendar, e-mail application, or address book. For example, a calendar could be used to predict future destinations, future routes to those destinations, and needs associated with entries in such calendar. In such a manner, offers could be targeted to an individual household member based on their future planned destinations, routes to those destinations, and even far-off travel destinations. For example, calendars could be parsed for addresses, times of day, and dates, to assemble a predicted route for each day. In such a manner, offers could be targeted in advance of such day to assist the individual household member with potential needs and desires associated with the day's schedule. In a similar manner, names of individuals or companies parsed from a calendar may then be searched in an address book, or e-mail application to determine location information associated with those calendar entries. Web information could be further mined based on data retrieved from such calendar or other application.

Another advantage of docking station 600 and its use with multiple handsets 690 is that each member of the household would have their own touch screen displaying offers, coupons, or other advertisements specifically targeted to that household member. For example, a family of six members, each with their own iPhone®, may utilize docking station 600 to display six very different sets of offers on the six screens associated with household members. In such a manner, docking station 600, unlike other embodiments of the present invention, does not need its own individual display or touch screen, and instead may communicate information to one or more individual screens of each handset 690 that is docked using docking station 600. In such a manner, the touch screens of each handset 690 may each be used as a user interface to the features and functionality of docking station 600. Thus, offers may be viewed, selected, and printed utilizing, for example, a touch screen of handset 690.

In one embodiment of the present invention, as described relative to previous embodiments, docking station 600 may download new offers from a server to members of the household in the middle of the night or otherwise during times of low network usage. In one embodiment, information from handset 690 or docking station 600 such as calendar information or tracked movements of the user may also be uploaded to a server to update user profiles during such same periods of time with low network utilization. In one embodiment, offers are only downloaded for household members whose devices are currently cradled or docked to docking station 600. Such an embodiment may further decrease the amount of required bandwidth. However in another embodiment, offers for all household members are downloaded to docking station 600 whether or not devices such as handset 690 associated with a particular household member is currently docked with docking station 600. Thus, a household member who has forgotten to dock their handset 690 overnight may dock the handset the next morning and still receive the benefit of offers generated the night before.

In another embodiment of the present invention, rather than detecting the need to replace consumables when such consumables are completely depleted or substantially depleted, the need to replace consumables based on the depletion of such consumables may be predicted based on the rate at which such consumables are deplinished. For example, an in-home advertising device may predict the date on which a particular consumable may be need to be replaced by tracking the number of printouts made by such device since the last replacement of a particular consumable. Alternatively, but similarly, the amount of such consumable remaining on a particular date may be utilized based on the installation date of such consumable to predict the date on which such consumable is exhausted. For example, an in-home advertising device may have had an ink or toner cartridge replaced on March 1. On March 15, the in-home advertising device may detect that the ink or toner has been reduced to half of its original capacity and thereby predict that the ink or toner may be completed depleted by March 30. Similarly, longer term data such as the average number of printouts of a particular advertisement or coupon per day may be calculated and utilized to predict a date by which additional paper should be shipped to arrive at a particular customer. Such a running average may be utilized in combination with a sensor so as to cross-check the calculation of the depletion date by sensing the amount left of the consumable itself. For example, for a paper consumable, a sensor may be utilized to detect the thickness of a roll on which such paper is mounted or the thickness of a stack of paper. Alternatively, an embedded counter in an in-home advertising device may be utilized to count the number of printouts made. Similarly, for ink or toner, a sensor may be utilized to sense the level of the ink or toner utilized. Alternatively, any other suitable sensor may be utilized as is currently utilized in printers and copiers.

Alternatively or additionally, a customer may place a manual order for additional consumables directly via a selection or input on the in-home advertising device or via an external web, voice, or alternative interface. In one embodiment, such a manual order may be rejected by in-home advertising device or by a remote server that also receives data regarding the current capacity level of a particular consumable being ordered. In such a manner, a customer placing a manual order for additional paper when a paper roll used by the customer still has ninety percent of its capacity remaining may prevent that customer from conducting such manual order. Such a mechanism may be utili7ed when a service provider or device vendor provides its customers with free consumables based on presumptive use of the in-home advertising device. Preventing unnecessary manual orders may reduce loss and customer abuse of the availability of such free consumables. Alternatively, rather than blocking a particular order, an automated message such as an email, text, or other message may be sent directly to an in-home advertising device for display to a customer to inform the customer that their current level of consumable appears to be sufficient at the current time. Alternatively, a manual order may be processed but a customer may be charged for additional consumables beyond the current demonstrated need of an in-home advertising device.

In one embodiment of the present invention, an in-home advertising device may periodically notify a server such as an advertising server as to its current location to ensure that advertising information directed to a particular in-home advertising device remains accurate. For example, an in-home advertising device that communicates over a cellular network such as a CDMA network may have its location verified based on the particular wireless base station or antenna site with which it communicates to a wireless network. In such a manner, the location of an in-home advertising device may be periodically identified on a daily, weekly, or monthly basis without the need for a manual input from a customer or other indication that the in-home advertising device has changed location. In one embodiment, an in-home advertising device may be equipped with a global positioning system chip to enable an in-home advertising device's location to be more particularly determined. In another embodiment, each time an in-home advertising device is connected to or registers with a network, whether via wireless, cable, fiber, or other network media, such connection or registration may by itself establish the approximate location of the in-home advertising device and may cause such location to be communicated by the in-home advertising device to a server to verify that advertising directed to such in-home advertising device is of proper scope and content.

Figure 7:
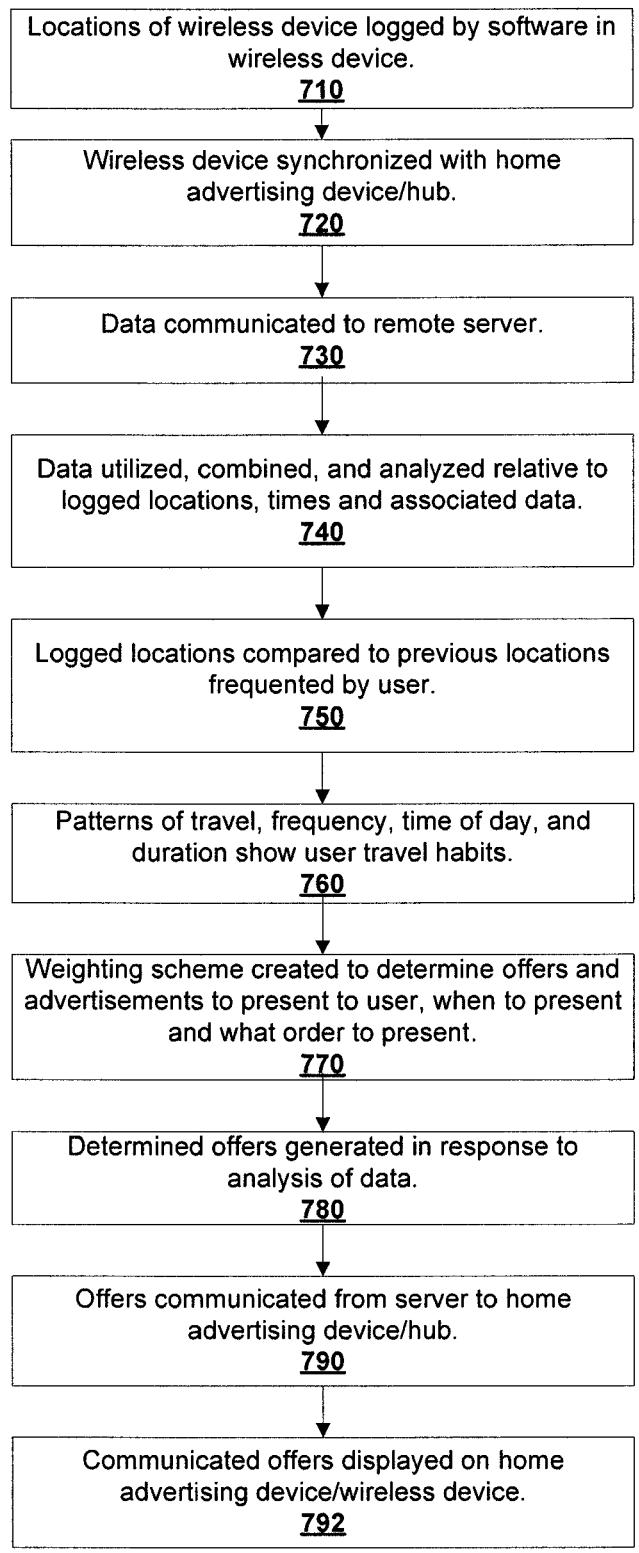
FIG. 7 illustrates a flow chart of one embodiment of the present invention.

FIG. 7 illustrates a flow chart of one embodiment of the present invention. The flow chart generally illustrates the use of a wireless device or mobile device such as a smart phone, lap top computer, iPod®, tablet computer, or any other suitable device to track the itinerary, schedule, locations, route, or any other combination of time and place associated with the daily routine of a user of such device.

In step 710, locations of the device are logged by software implemented on the device. Such locations may be logged in response to a manual input of a user or automatically. In either event, a list of locations are stored on such device for later communication to an in-home advertising device. Several methods of automatic logging of locations may be utilized. In one embodiment, the location of the device is continuously logged from the time the device is undocked from a particular in-home advertising device or docking station until the device is redocked with such in-home advertising device or docking station. In an alternative embodiment, a location is logged at predetermined intervals of time, such as once every ten minutes. In yet another embodiment, the location of the device is logged every time the device stops moving for a period greater than a predetermined amount of time. For example, the location of a device may be logged every time the device remains in the same position, or within a predetermined differential from a position, for more than five minutes. The predetermined differential prevents the logging of multiple entries that are in fact approximately the same location. In such a manner, the locations of a user of a device may be logged where the user actually stops for a predetermined period of time. The threshold time may be set, for example, to exceed the amount of time that would be spent during normal traffic conditions at a particular location. For example, the period of time could be set to be longer than the time spent waiting at a red light, for a traffic jam, or any other suitable event that may not be indicative of a true destination of a user of a device. The use of the term "location" within this application may correspond to a path rather than a particular location stopped at by the user. For example, in one embodiment, a path may be tracked rather than a series of points along such path stopped at by a user.

The logged locations of a device may be coupled with additional information such a time stamp indicative of the time of day a particular location was visited. For example, if a user is at a particular location around lunchtime, that information may be indicated through a time stamp that may be later analyzed in order to determine particular advertisements or offers to present to the user. A duration of time spent by a particular user at a particular location may also be logged, indicating the amount of time that a user spends at a particular location. Such duration may be utilized to predict user behavior and asses—the nature of the user's visit to a particular location. Locations, time stamps, and durations may be utilized to rank and prioritize which advertisements or offers to present to a particular user. For example, if a user spends two hours each day of the week at a particular location, presumably such location would be more highly prioritized than a location visited the same number times each week but for a much shorter duration. Similarly, a location visited at 11:00 pm when all of the business are closed surrounding that location would not receive as high a priority as a location visited during a primetime period such as lunch hour or immediately following the work day.

In step 720, the device is synchronized with an in-home advertising device or docking station through docketing, or any other suitable method, and the locations, timestamps, and durations logged by such device are communicated to the in-home advertising device or docking station. Such locations may be utilized by the in-home advertising device or an external server remotely located to establish the locations visited by the user, and even the order of such locations and overall route taken by the user utilizing the timestamps included with such locations. Thus, a wide range of information is available in order to particularly target the appropriate offer or advertisement to the user. Even locations that are not logged may be predicted based on likely routes to or in-between locations that are logged.

In step 730, all of such data may be communicated to a remote server for analysis in the generation of new offers. Such information may be combined with other information discussed above such as the day of the week on which such locations are visited, the frequency of visits to such locations, any patterns of user travel or behavior, or any other suitable information. In one embodiment, as previously discussed, such information may be communicated to a remote server during off-peak hours when a particular network has a lower period of bandwidth usage.

In step 740, all of such data may be utilized, combined, and analyzed relative to the logged locations. Such locations can then be compared to the known locations of business associated with advertisements and offers maintained by a server that generates such offers and advertisements for presentation to the user. For example, logged locations that are located within a certain distance of the locations of businesses associated with offers may be determined in order to select such advertisements or offers. In one embodiment, this is done by comparing the GPS coordinates of logged locations to the GPS coordinates of businesses associated with the advertisements. Such GPS coordinates of businesses may be stored in, for example a database maintained by the service that stores GPS coordinates of all store fronts of its advertising entities. In another embodiment, a third party database may be utilized to convert GPS coordinates into actual addresses, map locations, nearest intersections, or any other suitable location information that can then be utilized to compare logged locations to locations of businesses for which offers or advertisements are generated.

In step 750, the logged locations communicated to the server may then be compared to previous locations frequented by the user of the device. In such a manner, frequent locations may be tracked over a period of days, weeks, months or years. The results of such comparisons can be stored, for example, in a profile associated with the user.

In step 760, patterns of travel may be combined with frequency of such patterns, time of day in which locations are logged, and durations of stay at a particular location to present a very robust picture of a users travel habits. Again, the resultant data may be stored in a profile of a user.

In step 770, a weighting scheme may be utilized in order to weight different factors to determine which offers and advertisements to present to the user, when to present them, and in what order to present them. For example, a location visited for one hour every day of the week at lunch time may be assigned the highest weight relative to the rest of the individual's travel behavior, and be given a weighting factor of 10. Offers or advertisements associated with that location, such as those located within a mile radius, may always be presented first to a user each morning. However, offers for the same business may not be presented every day first, particularly if the user has not taken advantage of that offer or advertisement after repeatedly being presented with such offer or advertisement. Instead, another business located within that same one mile radius may be presented on alternating days until an offer is selected by a particular user, printed, and/or redeemed. In one embodiment, the number of times an offer is selected, printed, or redeemed may alter the weighting of that offer. For example, if a sandwich coupon is selected, printed and redeemed every time it is presented, it may receive a higher rating than offer selected just based on patterns and frequency of travel. Time of year may also play a role, as particular offers redeemed by a user during the prior year around Christmas time or any other date corresponding to an anniversary, birthday, or other event, may again be presented the next year on the same day. Similarly, if the location is only visited on a particular day of the week, the offer may be presented to the user only on that day of the week that is associated with a location logged on that day of the week by the user.

In step 780, the determined offers are generated in response to the analysis of such data and the weighting of offers. for the next morning.

In step 790, the offers are communicated from the server to the in-home advertising device or docking station, again at a low bandwidth period, such as later on the same night.

In step 792, such communicated offers are displayed on the in-home advertising device, or the hand-held synchronized or docked with a docking station. The number of offers presented may be determined in response to a default number set by the service provider, the user, or based on the number of offers historically viewed by the user. For example, if four offers are displayed at one time, and a user never displays more than two screens worth of offers, a reduced number of offers may be communicated to the in-home advertising device or docking station. For example, in one embodiment, only twelve offers may be communicated.

In one embodiment, the display of an in-home advertising device, or mobile device synchronized or docked with a docking station may be segmented into four portions corresponding to four categories of offers. For example, in one embodiment, the screen may display four sections assigned to the areas of dining, errands, retail, and special, each corresponding to an area of determined interest for the user. For example, special category may change based on the time of year and the season, weather, proximity to holidays, or upcoming events in the user's calendar or other scheduling application. In one embodiment, the screen may be segmented into four links corresponding to categories that may then be selected by a user to display offers in the category. In another embodiment, the segmented screen displays the top rated offer in each category, where the user can select an additional or alternative offer using a touch command on the screen. For example, swiping a finger on that area of the screen may cause that segment of the screen to display a different offer. Pressing the offer may select the offer to display a full screen version of the offer, either with or without additional details on the offer.

FIG. 8 illustrates one example of a weighting scheme utilized to weight different offers to determine which offers to present to a user and the order in which they are to be presented. Thus, in the example illustrated in FIG. 8, many factors are illustrated as components to such weighting. Location, time of day, duration, day of the week, month of the year, date, frequency, prior redemption, user profile information, user demographics information, predicted user interests, and advertisement priority may be utilized to weight a particular advertisement. In one embodiment, advertisements are assigned a rating of 1-100 based on one or more of the illustrated factors and any other suitable factor. For example, time of day may be assigned a number between one and twenty if it is viewed as a significant factor in offer redemption. Similarly, prior redemption of the same or similar offer may be given a higher weight than time of year, or day of week. Similarly, an offer in an area in which the user has a high degree of interest may be assigned 10 points and an area of low interest may be given 0 points or 1 point.

In one embodiment, some offers are automatically excluded regardless of the other factors if one or more factors indicate a prediction that a user will not be interested. For example, if a user is determined to only visit a location after a particular business is closed, that one factor of time may exclude the offer by itself. It should be appreciated that, in embodiments where a docking station is utilized to present offers to a household of users, each user will be presented with very different offers based on their individual interests, itineraries, and redemption patterns.

FIG. 8 illustrates four examples of offers that are rated based on the weighting of different factors described herein. In one embodiment, as illustrated in Figure. 8, Offer 802, Sal's Drugstore, is automatically excluded and given a rating of 0 based on the user never being near the location of Sal's Drugstore during the operating hours of the store as indicated by weighting factor 804. In other embodiments, Offer 802, may still be presented to a user if other weighting factors generate a score that meets or exceeds a threshold value. For instance, in some embodiments, the score of a single weighting factor that meets or exceeds a threshold value may cause Offer 802 to be presented to the user despite the user never being near the location of Sal's Drugstore during the operating hours of the store. For example, if the user's profile score indicates a high interest in the advertised product (e.g., if the user has purchased similar products in the past) then Offer 802 may still be presented to the user. Still, in other embodiments, a combined score of one or more of the weighting factors that exceeds a predetermined threshold value (e.g., 60) may cause Offer 802 to be presented to the user despite the user never being near the location of Sal's Drugstore during the operating hours of the store.

Offer 810, Bajas, is given a rating of 99 based on the user always traveling near such location each weekday between 6 and 7 pm, the fact that tomorrow is a weekday, the fact that the user frequently redeems coupons for margaritas at such location, and the weather being over 95 degrees. Offer 820, the Purple Palace, is given a rating of 76 based primarily on the fact that it is located near to a lunch location known to be frequented by the user on that particular day, the fact that user's anniversary occurs within the next week, and the fact that the user's spouse has indicated a desire for products sold by such location in his or her user profile. Offer 830, Fuzzy's Tacos, a new restaurant located near the user's work location, is given a rating of 68 has just started advertising with the advertising service provider and is paying a premium to the advertising service to increase the rating given to its offers. For such examples, Bajas would be the first offer presented to the user, followed by Purple Palace, followed by Fuzzy's Tacos. In the depicted embodiment, the offer for Sal's Drugstore would not even be presented to the user. Although FIG. 8 illustrates the use of the same weighting factors for scoring offers 802, 810, 820, and 830, in certain embodiments, each offer may be scored using different weighting factors. For example, different weighting factors may be utilized to score offers based on a product type (e.g., restaurants, home improvement, vehicles, etc.).

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The disclosed embodiments were chosen to explain the principles of the invention and the practical application, and to enable others of ordinary skill in the art to understand the invention for various embodiments with various modifications as are suited to the particular use contemplated.

What is claimed is:

1. A docking station system for delivering targeted ads to users, the docking station system comprising:
  at least one component operable to facilitate an interface for communicating with a plurality of electronic devices, wherein the plurality of electronic devices are operable to communicate over a network;
  a transceiver module operable to:
    receive a user profile of a user of one of the plurality of electronic devices over the network, the user profile stored in a memory of the electronic device;
    receive a calendar entry of the user of the electronic device over the network, the calendar entry stored in a memory of the electronic device;
    receive information related to an interaction of the user with the electronic device, wherein the interaction is stored in a memory of the electronic device in response to user input on the electronic device; and
    receive information related to travel habits of the user of the electronic device, the information stored in a memory of the electronic device and being determined in response to one or more automatically determined locations of the electronic device;
  a processing component operable to execute instructions to:
    determine a first future location associated with the user profile, the first future location based on travel habits of the user of the electronic device, wherein the travel habits include patterns of travel, location, and time of day;
    determine a second future location associated with the calendar entry, the second future location being a location associated with an event indicated in the calendar entry;
    determine one or more routes between the first future location and the second future location;
    determine a starting time, at which, the user will commence travel from the first future location to the second future location and a travel time, during which, the user will travel from the first future location to the second future location, the starting time determined by automatically calculating the amount of travel time necessary to arrive at the second future location from the first future location;

select a plurality of advertisements valid during the travel time and being associated with a location proximate to the one or more routes, wherein the advertisements are communicated over the network prior to the starting time; and initiate displaying the plurality of advertisements on a display device of the electronic device prior to the starting time, the plurality of advertisements being displayed in order of one or more scores determined by the processor, the one or more scores being determined in response to the user profile, a history of the interaction of the user with the electronic device, travel habits, frequency of purchases of an advertisement type, a time of day associated with the calendar entry, merchant data associated with the advertisements, and a proximity of a location associated with each advertisement to the one or more routes; and a memory component operable to store the received advertisements, wherein at least one electronic device of the plurality of electronic devices is operable to communicate with at least one of a printer or a display, further wherein the at least one of the printer or the display is operable to respectively print or display at least one advertisement of the plurality of advertisements in response to instructions generated by the processing component in response to a user-selection, the at least one advertisement operable to be printed or displayed in an order corresponding to the one or more scores of the at least one advertisement.

2. The system of claim 1, wherein the at least one advertisement is operable to be printed with the consumer identifier in an order corresponding to the one or more scores of the at least one advertisement, further wherein the processor is further operable to predict the date on which a consumable utilized by the printer will be exhausted and submit an order for the consumable for delivery prior to the date such consumable is exhausted.

3. The system of claim 1, wherein the system includes another memory component that stores tracking information on an individual routes of each member of a household on a daily basis.

4. The system of claim 1, wherein the system includes another memory component that stores destinations for a member of a household in response to tracking locations along an individual route of the member of the household, wherein a location is stored as a destination in response to the member of the household remaining proximate to the location for a predetermined period of time.

5. The system of claim 1, wherein the plurality of advertisements are selected in response to a change in a daily routine of a household member.

6. The system of claim 1, wherein the plurality of advertisements are selected in response to the frequency at which a location is visited by a household member.

7. The system of claim 1, wherein the plurality of advertisements are selected in response to the pattern of historical travel and a day of the week.

8. The system of claim 1, wherein a score is generated for each advertisement of the advertisements by the remote server based on a plurality of weighting factors including a user profile of the plurality of user profiles associated with the advertisement, the data associated with the advertisements, the time of day, and the proximity of the location, and wherein the advertisements are displayed based on the score for each of the advertisements.

9. An advertising docking station device for delivering targeted ads to a user, the advertising docking station device comprising:

a device interface to communicatively couple a plurality of electronic mobile devices each associated with a user of a plurality of users;

a transceiver module operable to:
  receive a user profile specific to a user of the plurality of users, wherein the user profile of each user of the plurality of users is at least based on predicted geographical locations of the user within a temporal period;
  receive information related to an interaction of the user with the electronic device; and
  communicate with a remote device for receiving advertisements, the advertisements selected based on a comparison of one or more user profiles associated with the plurality of users of the plurality of electronic mobile devices, a history of the interaction of the user with the electronic device, data associated with a plurality of advertisements, and predicted location information for each of the plurality of electronic mobile devices, wherein the plurality of advertisements are provided to the device interface to display the advertisements to the plurality of users following receipt of the advertisement at the advertising device;

a memory component operable to store the advertisements; and a processing component operable to execute instructions to perform the following operations for each user of the plurality of users:
  determine, based on the user profile of a respective user, a first future location associated with the user profile and a second future location associated with the user profile, wherein the user profile is stored in a memory of the electronic device;
  determine one or more routes between the first future location and the second future location, the routes determined using a map stored in the memory component;
  determine a starting time, at which the respective user will commence travel from the first future location associated with the user profile and the second future location associated with the user profile and a travel time during which the respective user will travel from the first future location to the second future location, the starting time determined by automatically calculating the amount of travel time necessary to arrive at the second future location from the first future location; and
  determine which of the advertisements to display on an electronic mobile device of the respective user based on whether the advertisements will be valid at the one or more locations during the travel time and
  initiate displaying of the determined advertisements on the electronic mobile device of the respective user prior to the starting time;

wherein the processing component determines which of the advertisements to display in response to a time of day, the starting time, and the traveling time based on the user profile of the respective user, further wherein at least one electronic device of the plurality of electronic devices is operable to communicate with at least one of a printer or a display, further wherein the at least one of the printer or the display is operable to respectively print or display at least one advertisement of the plurality of advertisements in response to instructions generated by the processing component in response to a user-selection, the at least one advertisement operable to be printed or displayed in an order corresponding to one or more scores of the at least one advertisement.

10. The advertising device of claim 9, wherein the processing component is further operable to execute instructions included in compatibility software in response to a directory structure of a particular model of one of the plurality of electronic mobile devices communicatively coupled with the advertising device.

11. The advertising device of claim 9 wherein the advertisements are determined in response to a determined location, the location determined by searching for an address associated with a name on a software application stored on one of the plurality of electronic mobile devices.

12. The advertising device of claim 9, wherein the advertising device initiates displaying of the determined advertisements on the respective determined electronic mobile device only in response to the electronic mobile device being communicatively coupled to the advertising device.

13. The advertising device of claim 9, wherein the predicted location information is determined by logging a historical location and a time stamp associated with the historical location, and the processing component determines which of the advertisements to display in response to the predicted location information and the time stamp.

14. The advertising device of claim 9 wherein a determined advertisement displayed on a first electronic mobile device of a first user within the plurality of electronic mobile devices is determined based on a comparison of at least a user profile of a second user associated with a second electronic mobile device within the plurality of electronic mobile devices, the determined advertisement indicating to the first user that an item associated with the determined advertisement may be of interest to the second user.

15. The system of claim 1, wherein the transceiver module is further operable to display a dynamic advertising content based on the interaction of the user with the electronic device.

16. The advertising device of claim 9, wherein a varying level of restitution is offered to the user based on the interaction of the user with the electronic device.

\* \* \* \* \*